Jan. 24, 1967 A. NOYES, JR 3,300,731

DIGITAL FREQUENCY SYNTHESIZER HAVING A PLURALITY OF SELECTABLY CONNECTABLE PHASE-LOCKED DIGIT INSERTION UNITS

Filed July 27, 1964 6 Sheets-Sheet 1

INVENTOR.

ATHERTON NOYES JR.

BY Rines and Rines

ATTORNEYS

INVENTOR
ATHERTON NOYES JR.

BY

ATTORNEYS

INVENTOR
ATHERTON NOYES JR.

BY

ATTORNEYS

INVENTOR.
ATHERTON NOYES JR.
BY

ATTORNEYS

Jan. 24, 1967 A. NOYES, JR 3,300,731

DIGITAL FREQUENCY SYNTHESIZER HAVING A PLURALITY OF SELECTABLY CONNECTABLE PHASE-LOCKED DIGIT INSERTION UNITS

Filed July 27, 1964 6 Sheets-Sheet 5

INVENTOR.
ATHERTON NOYES JR.

BY

ATTORNEYS

INVENTOR.
ATHERTON NOYES JR.
BY Rines and Rines
ATTORNEYS

United States Patent Office 3,300,731
Patented Jan. 24, 1967

3,300,731
DIGITAL FREQUENCY SYNTHESIZER HAVING A PLURALITY OF SELECTABLY CONNECTABLE PHASE-LOCKED DIGIT INSERTION UNITS

Atherton Noyes, Jr., Concord, Mass., assignor to General Radio Company, West Concord, Mass., a corporation of Massachusetts Filed July 27, 1964, Ser. No. 385,219
17 Claims. (Cl. 331—2)

The present invention relates to frequency-synthesizing apparatus and, more particularly, to digitally indicating frequency generating equipment.

It has been previously proposed to synthesize the output frequencies of alternating current sources, for use in radio transmission, reception and measurements requiring adjustable yet highly stable frequencies, by employing a standard stabilized frequency and providing for the adding or subtracting of selected frequency increments derived from this standard frequency over any desired frequency range; providing, for example, an output that may have a range of megacycles, variable in digital steps, which may be spaced by any fraction of a cycle, if desired. Certain of such prior-art synthesizers, however, have involved very complex and expensive equipment, including numerous mechanically ganged tuned filters for producing the digital frequency increments.

An object of the present invention, accordingly, is to provide a new and improved frequency synthesizer of the above-described character that shall not be subject to such disadvantages, but that, to the contrary, shall embody minimal equipment, and eliminate the necessity for elaborate L.-C. filtering.

Other prior-art devices have involved large numbers of leads or conductor input pairs carrying different frequencies into the synthesizing units; whereas the present invention, through the employment of novel digit insertion units enables multiple-step frequencies to be attained with but a pair of standard frequency input lines.

Still a further object of the invention is, through the employment of locked oscillator assemblies and novel "capture-lock" switching in the digit insertion units, to eliminate the requirement for many of the tuned coils and condensers necessary in prior-art circuits for insuring the desired pure frequency outputs.

Another object of the invention is to provide a synthesizer capable of continuous, as opposed to step-wise, generation of an output frequency with simultaneous monitoring of the continuously adjustable frequency in terms of a series of step-wise adjustable frequency controls.

Other and further objects will be pointed out hereinafter and will be more particularly delineated in the appended claims.

The invention will now be described in connection with the accompanying drawing, FIG. 1 of which is a combined block and schematic circuit diagram illustrating a preferred embodiment of the invention;

FIG. 2 is an explanatory diagram illustrating one position of operation of the system of FIG. 1;

FIG. 2*a* is an elevational view of a conventional dial;

Figure 1:
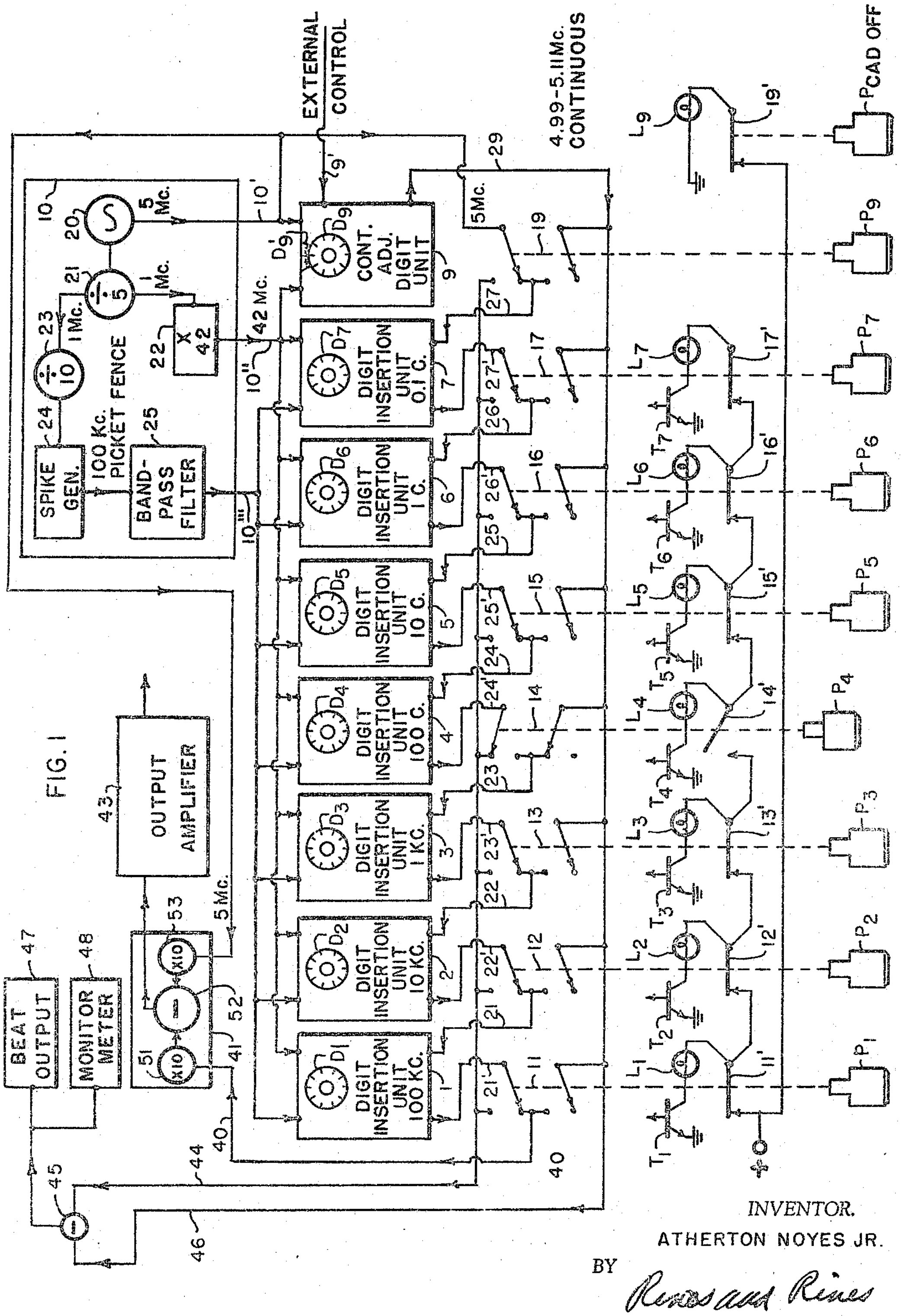
Figure 3:
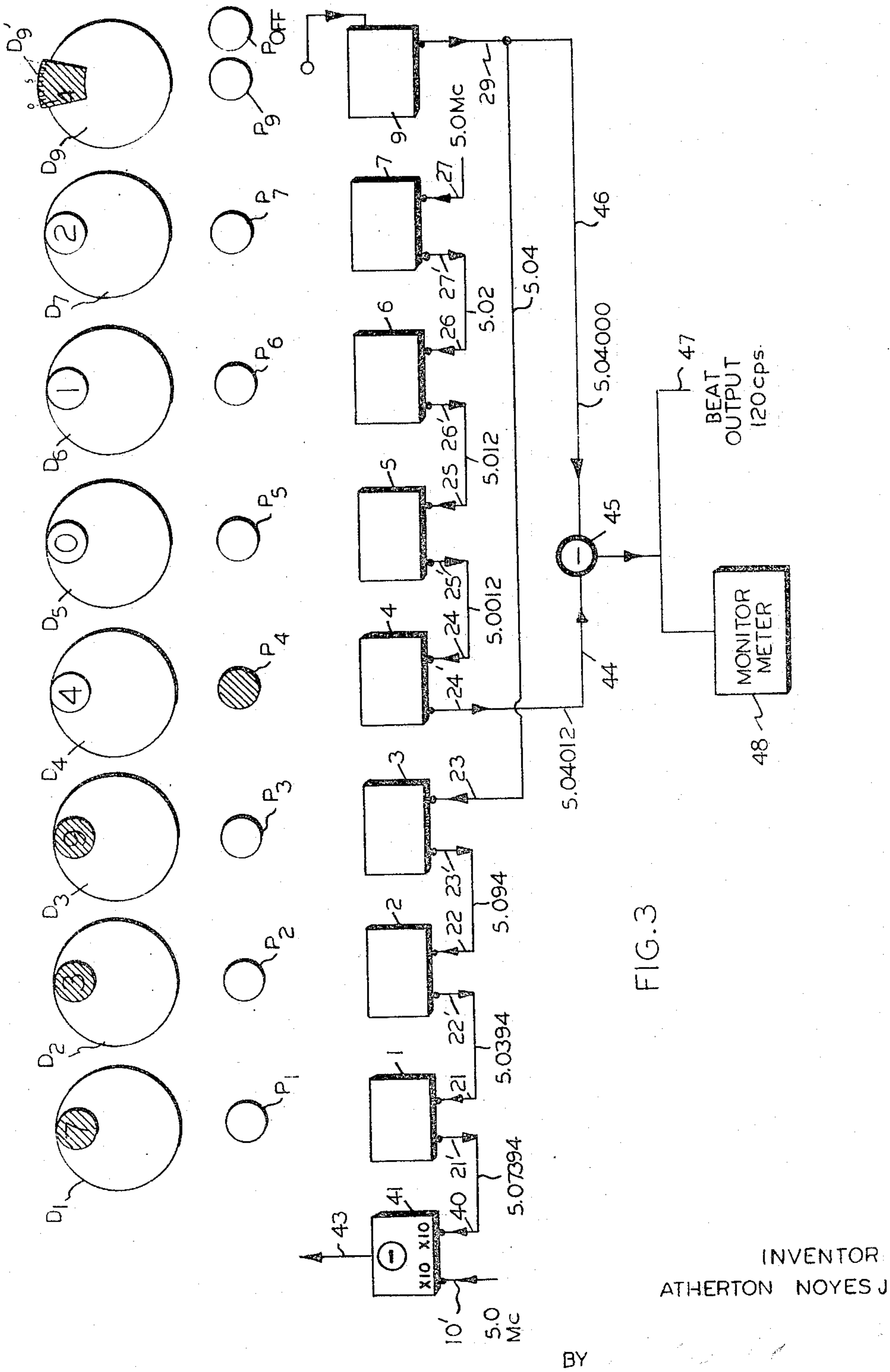
FIG. 3 is a view similar to FIG. 2 of a second position of the operation of the system of FIG. 1.
Figure 4:
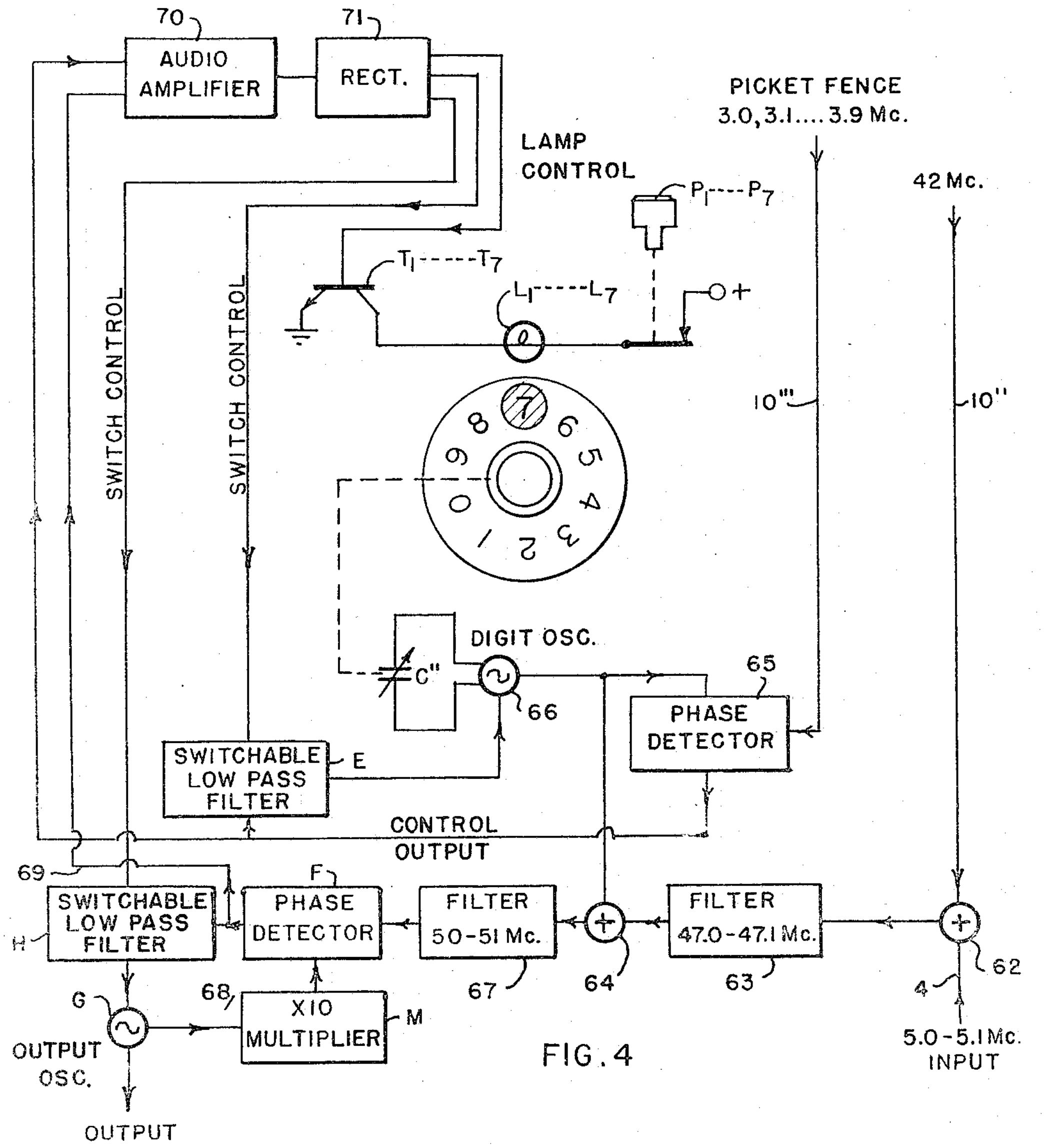
FIG. 4 is a block diagram of the details of the digit insertion units of FIGS. 1 through 3, with circuit detail shown in FIG. 4*a*.

Referring to FIG. 1, a plurality or train of digit insertion units 1, 2, 3, 4, 5, 6 and 7, preferably of the type illustrated in detail in FIG. 4, is provided to develop incremental steps of final output frequency, respectively, in 100 kc., 10 kc., 100 cycle, 10 cycle, 1 cycle, and tenth of a cycle steps. Associated with each incremental or step-frequency digit insertion unit 1 through 7 is a corresponding step-adjustable control knob and dial $D_1$ through $D_7$ that selects the digit desired at each digit location in the digitally-expresed output frequency. The selected digit on its corresponding dial is illuminated by a lamp, with lamps $L_1$ through $L_7$ being associated with, for example, the uppermost region of the respective translucent dials $D_1$ through $D_7$, as more particularly shown in FIG. 3.

A further digit unit of the continuously adjustable type, as distinguished from the step or incremental units 1 through 7, is provided at 9, embodying circuits of the preferred type shown and later discussed in connection with FIG. 5, and having an associated variable dial control $D_9$ and an illuminating lamp $L_9$. The continuously adjustable digit unit 9, if connected in circuit, either supplements the whole group or replaces a preselected subgroup of the digit insertion units to provide for frequency searching and comparison by continuous adjustment, as later explained.

The synthesizer itself may be controlled by an ancillary frequency source of coherent standard frequencies, illustrated at 10, embodying, for example a crystal-controlled or otherwise stabilized oscillator 20, producing, as an illustration, a 5 mc. standard output at 10′. If desired, an external standard may be employed to lock the frequency source 10, by the use of conventional phase-lock circuitry (not illustrated) to the external precision frequency. Additional standard frequencies employed for later-described purposes should also be synthesized in the source 10, including, for example, a 42 mc. signal and a "picket fence." In the examples chosen, the 42 mc. signal is coherently generated by using a factor-of-five divider 21 of any conventional type to derive a 1 mc. signal which is then applied to a factor-of-forty-two multiplier 22, again of any conventional type. The 42 mc. standard output appears at 10″. The 1 mc. output of the divider 21 is also applied to a factor-of-ten divider 23 controlling an impulse or strike generator 24 to generate spikes or pulses at a 100 kc. repetition rate that, when passed through a 3.0 to 3.9 mc. bandpass filter 25, produce the so-called "picket fence" of successive tenth of a megacycle frequency steps at output 10‴; specifically, the frequency components 3.0, 3.1, 3.2 . . . 3.9 mc. The frequencies chosen for this illustrative description are considered to be well chosen for the purpose of minimizing the generation of spurious frequencies by the mixture of the system. However, they are merely illustrative, and other intelligently selected frequency combinations are within the scope of the invention.

Briefly stated, the identical digit insertion units 1 through 7, under the control of the standard source 10, and employing also the outputs at 10″ and 10‴ are used to generate successive increments or steps corresponding to successive decimal digits of a number representing a frequency to be generated. The continuously adjustable digit unit 9 is employed, in accordance with the invention, to provide continuous variation beyond the last digital step, or to enable functional replacement of any desired number of the digit insertion units producing the synthesized frequency output of the system by this continuously variable unit, for purposes later more fully explained. While the invention is herein described in connection with decimal system numbers, it is to be understood that the principles underlying the same are equally useful in binary and other numerical systems.

The continuously adjustable digit unit 9 may be designed to provide continuous variation of somewhat more than one decade. Its actual output frequency range may, for instance, be from 4.99 to 5.11 mc. instead of from 5.0 to 5.1 as is the case with the typical digit insertion unit in this example. The dial $D_9$ may have major dial lines numbered from 0 to 9, some of which are shown in FIG. 5 (corresponding to output frequencies from 5.0 to 5.09 mc.), and additional markings at —1 and 10. A separate, fixed scale $D_9'$ illuminated by the rearward lamp $L_9$, is shown behind the dial $D_9$ to provide intermediate readings between the main dial lines, such as 4.3 in the showing in FIG. 5. This scale is graduated in ten divisions from 0–1. It is to be noted that if the line numbered 10 on the mail dial is rotated to the line 1 at the right-hand end of this fixed scale, the complete dial reading is 11 and the output frequency of the unit is 5.11 mc. On the other hand, when —1 on the main dial is set at 0 on the fixed scale, the output frequency is 4.99 mc.

Figure 2:
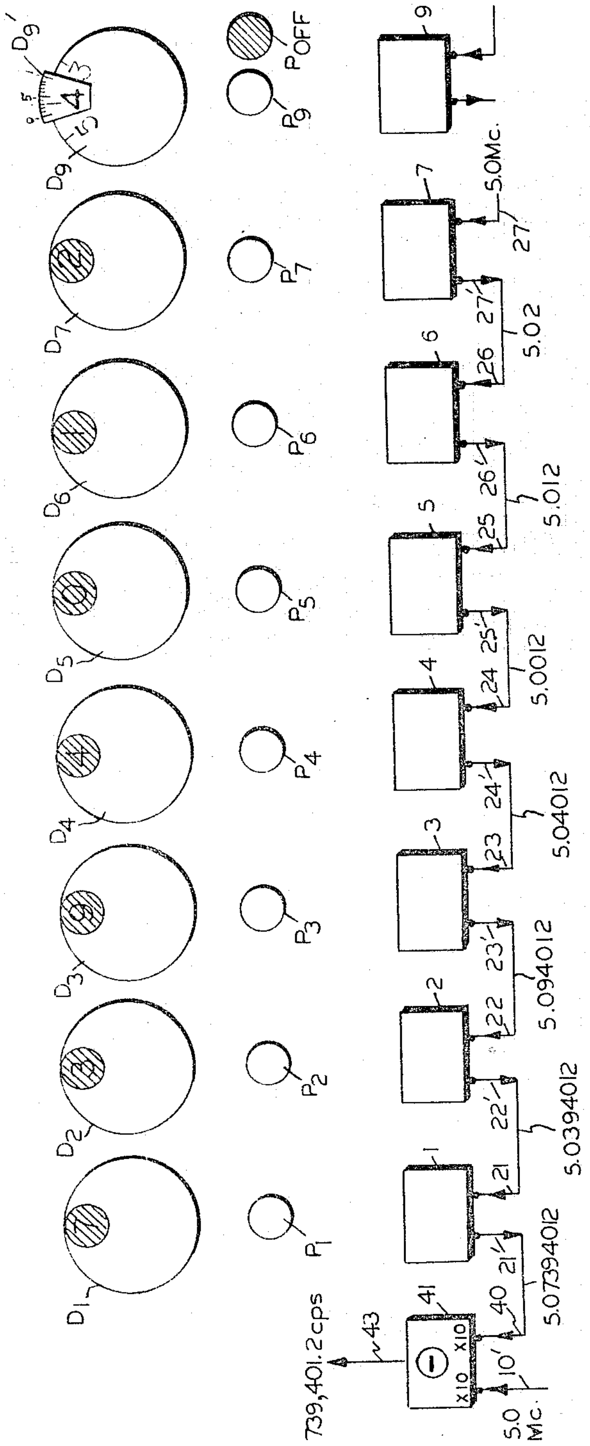
Figure 2A:
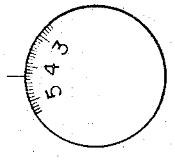

This dial arrangement has an advantage, not perhaps immediately obvious, which should be pointed out. In the complete synthesizer as here illustrated, with seven digit dials and one continuously adjustable dial, it is evident that since all digit insertion units are identical, all seven dials increase frequency for the same rotational sense; it generally being preferred that the sense for frequency increase shall be clockwise. It would, therefore, be desirable for operator convenience to have the continuous dial increase frequency with clockwise rotations, also. A conventional dial, however, carrying dial subdivisions past a fixed fiducial or reference mark on the panel, will, if increasing frequency for clockwise rotation, have line numbering which is "backwards." That is, the number 5, for example, will be to the left of the number 4 at the top of the dial as illustrated in FIG. 2*a*. If the fiducial or reference line lies somewhere between 4 and 5, for example at 4.3, it is very easy for the operator to misread this dial as 5.7.

In the dial arrangement $D_9$–$D_9'$ of the present invention, however, the danger of such mis-reading is minimized. For example, assume that in FIG. 2 button $P_9$, later discussed, has been actuated, so that all eight dial readings contribute to the output frequency. The operator, reading the series of numbers from left to right, will automatically and without error read 73940124.3.

A plurality of double-pole, double-throw switches 11, 12, 13, 14, 15, 16, 17 and 19, corresponding, respectively, to each of the digit units 1 through 7 and 9 is provided to transmit signal frequencies in the 5.0 to 5.1 mc. range, between successive serially interconnectable digit units. The switches 11 through 17 and 19 are operated by respective latching push buttons $P_1$ through $P_7$ and $P_9$. Push buttons $P_1$ through $P_7$ simultaneously actuate a further set of switches 11' through 17' to enable the extinguishment of corresponding dial-illuminating lamps $L_1$ through $L_7$; and push button "$P_{CAD\ OFF}$" controls the lamp $L_9$ of dial $D_9$–$D_9'$ and also unlatches all other push buttons. In a preferred embodiment of the invention, the push buttons $P_1$ to $P_7$ are positioned directly in line below the corresponding dials $D_1$ to $D_7$, with $P_9$ in line with $D_9$, also, so that the functional relationship is apparent to the operator. With the push buttons $P_1$ to $P_7$ and $P_9$ all unlatched, each of lamps $L_1$ through $L_7$ will be illuminated through closed switches 11' through 17', respectively, from the terminal + through corresponding sensing transistors $T_1$ through $T_7$ to ground, the function and operation of the transistors being later discussed. Lamp $L_9$ is turned off by disconnection at switch 19' from the + terminal. Thus the digits at the top of each of the dials $D_1$ through $D_7$ will be illuminated for reading and $D_9$ will be dark. If $P_9$ is actuated, $L_9$ will become illuminated also because "$P_{CAD\ OFF}$" is unlatched and switch 19' is closed Upon the actuation of any of the switches $P_1$ through $P_7$, such as the upward movement of button $P_4$ in FIG. 1, the lamps corresponding to the digit insertion unit dials to the right of the actuated button, including the lamp associated with the digit insertion unit dial corresponding to the depressed button, will be open-circuited from the + terminal, extinguishing the illumination of all such dials. The lamp $L_9$ at the continuous unit, however, will be turned on. Thus, in FIG. 4, each of lamps $L_4$, $L_5$, $L_6$ and $L_7$ will be extinguished and digital insertion unit dials $D_4$, $D_5$, $D_6$ and $D_7$ will be dark. The dials of the digit insertion units 1, 2 and 3 will, however, be illuminated to indicate the digits selected thereon, and the dial $D_9$–$D_9'$ of the continuously adjustable digit unit 9 will also be illuminated for reading.

It is now in order to explain, by illustrative example, the purpose and functional operational results attained by the above construction. If all the push buttons $P_1$ through $P_7$ and $P_9$ are unactuated, the 5.0 mc. standard frequency at 10' will be applied through the upper switch element of switch 19 to the input 27 of the digit insertion unit 7. The output 27' of the digit insertion unit 7, containing the 5.0 mc. input plus a first decimal step of increment added by the unit 7, will similarly be serially fed at 27' through the upper switch element of switch 17 to the input 26 of the next-successive digit insertion unit 6; and so on along the train or chain of serially connected digit insertion units, with the resultant seven-place decimal output 21' of unit 1 being applied through the upper switch element of switch 11 at 40 to an output multiplier mixer 41. As will be discussed later, each digit unit performs two functions; it adds digit information corresponding to its dial setting and also divides any digit information from preceding units by ten, so the new digit information is always inserted at the same relative position. The illuminated dials $D_1$ through $D_7$ will indicate this seven-place number. Referring, for example, to FIG. 2, for the dial settings therein illustrated, with unit 9 off, the output at 40 will be 5.07394012, derived as follows: 5.0 mc. applied to input 27 of unit 7 which is set at step "2" on dial $D_7$ to produce 5.02 mc. at output 27' and input 26 of unit 6; an output of 5.012 mc. at output 26' of unit 6 as a result of the "1" setting of dial $D_6$ thereof and the division by 10 of the previous digit information. Respective megacycle outputs of 5.0012, 5.04012, 5.094012, 5.0394012 and 5.07394012 are the further result, by this repetitive process, of the illustrated settings "0," "4," "9," "3" and "7" of respective dials $D_5$, $D_4$, $D_3$, $D_2$ and $D_1$. This output from digit unit 1 at 40 may be multiplied by a conventional factor-of-ten multiplier 51 in the mixer-multiplier 41, FIG. 1, and mixed at 52 (in FIG. 1) with 50 mc. derived from the 5 mc. standard fed from 10' to a similar factor-of-ten multiplier 53, producing the synthesizer output of 739,401.2 cycles.

In the above example, the output frequency at 40 was multiplied by a factor-of-ten, to make possible an output frequency range from 0 to 1 mc. With the dials set as described, the output frequency at 43 was 739.4012 kc.

It is obvious, of course, that if only a smaller range of output frequencies is required, this multiplication may not be needed. For instance, if the output at 40 is compared directly with 5.0 mc. from 10' in a mixer 41, the output range will be from 0 to 100 kc.; and, with the dials set as illustrated, the output will be 73,94012 kc.

As another example, the frequencies at 40 and 10' could each be divided by ten before mixing, so that the output range would be from 0 to 10 kc. In the above example, the output frequency would be 7.394012 kc. Alternatively, the frequency at 40, with or without multiplication or division can be added to, rather than subtracted from, standard frequencies derived from the primary source, to obtain coverage in any desired part of the frequency spectrum. It is thus apparent that the scope of the invention is not limited to the particular combination of functional sub-units shown in the drawings.

If, moreover, it is desired to vary the frequency at 40 (and consequently the output frequency) continuously through a certain frequency range, the continuously adjustable decade unit 9 may be inserted into circuit to supplement or replace any group or number of digit insertion units and to permit substitute reading of the dial $D_9$–$D_9'$ for the dials of the functionally replaced units. Thus, in FIGS. 1 and 3, the selection of pushbutton $P_4$ has not only extinguished the lamps $L_4$, $L_5$, $L_6$ and $L_7$ associated with dials $D_4$, $D_5$, $D_6$ and $D_7$, as previously explained, but the group of units 4, 5, 6 and 7 has become disconnected from the input 23 of the first unit 3 of the remainder of digit insertion units to the left of the selected unit 4, and the output 29 of the continuously adjustable digit unit 9 has now been applied by the lower switch element of switch 14 to the input 23 of unit 3. Thus the output of the unit 9 functionally replaces the output of the group of units 4, 5, 6 and 7 in the synthesizing of the final output frequency.

In order to compare or calibrate the setting of the continuously adjustable unit 9 with the setting of digit insertion units 4, 5, 6 and 7 which it now functionally replaces, the output of units 4, 5, 6 and 7 is automatically connected by the upper switch element of switch 14 to conductor 44 for application to a calibrating mixer 45. The output at 29 of the continuously adjustable digit unit 9 is also applied at 46 to the mixer 45 and the beat output may be obtained at 47 or monitored at 48, as desired. If the unit 9 is set at the precise settings of units 4, 5, 6 and 7, zero beat will result. If the output of unit 9 is set at a frequency different from that generated by units 4, 5, 6 and 7 by an amount equal to one major division of the dial of unit 9 (which is the same difference as would be produced by a unit step in the first of the replaced digits—digit unit 4 in this case), a beat frequency of 10 kc. will result.

In FIG. 3, a condition corresponding to this mode of operation is illustrated, the unit 9 functionally replacing units 4, 5, 6 and 7. When the beat output at 47–48 is zero, the dial at $D_9$–$D_9'$ is set at "4012," and the output is 739401.2 c.p.s., as in FIG. 2. If, however, it is set at "4000," as shown in FIG. 3, a 120 c.p.s. beat will be produced between the two inputs of 5.04012 mc. and 5.04000 mc. to the calibrating mixer 45. While the actual dial calibration of $D_9$–$D_9'$ may be readable to only two significant figures, it is calibratable to three or more figures through zero beat indication, or by measurement of the beat frequency. It will be observed that a change of only 1.2 c.p.s. in output frequency has produced a 120 c.p.s. beat note, in this example.

If it is desired to control the synthesizer frequency electrically from an external source, as for frequency sweeping, FM modulation or phase-locking, an external control voltage may be applied at 9' to the unit 9 (FIG. 1), as later described in connection with FIG. 5. If an external sweep voltage is applied to tune the unit 9 through a swept range, each time zero beat is attained a marker or other impulse may be generated at the calibrating mixer 45, and at other frequencies at the output of unit 9 the value of the beat frequency at 47 is a measure of the frequency difference of the setting of the unit 9, as before explained, and also a measure of the deviation of the final output frequency at 43 from that shown by the digit dials. By the use of an external audio oscillator and mixer to mix the audio oscillator output with the beat frequency at 47, additional marks can be generated whenever the beat frequency coincides with the external audio oscillator frequency.

It should be emphasized that a 10 kc. beat note results when the output of unit 9 is displaced by an amount equal to one of its major dial divisions from the zero-beat position. The change in output frequency corresponding to this ranges from 0.01 c.p.s. if $P_9$ is actuated, to 100 kc. if $P_1$ is actuated. The beat note is strictly proportional to the amount the frequency of unit 9 has been moved away from the zero beat condition, with the noted proportionality factor of 10 kc. per major dial division of unit 9. The change in final output frequency resulting from this change in frequency of continuously adjustable digit unit 9 is, of course, also strictly proportional to the observed beat note, by an additional multiplying factor which, as illustrated above, increases by a factor-of-ten each time the actuated button is moved one place to the left.

This means that if a frequency meter of single range (for instance, 0 to 50 kc.) is permanently connected to 47, this meter can indicate changes in output frequency with very high magnification, such as 10 kc. for 0.01 c.p.s. change in output frequency. Also, without any changes in the frequency meter, other magnification ratios are immediately available, merely by actuating another pushbutton.

Furthermore, if a simple auxiliary unit is employed, as suggested above, to generate markers at other than center frequency, this auxiliary marker generator need have no great range of adjustment. For instance, if the oscillator of this marker generator is set at 15 kc., auxiliary markers can be produced whenever the beat frequency at 47 is 15 kc., 30 kc., 45 kc., etc. and, depending only on which button is now actuated, these markers may indicate deviations from center frequency of ±0.015, ±0.03, ±0.045 c.p.s. with $P_9$ actuated; or, with $P_5$ actuated, ±15, ±30, ±45 c.p.s.; and so on.

This ability to measure small changes in output frequency, with magnifications selectable through a very large range, can produce many useful results. One such application is illustrated in FIG. 6.

Figure 6:
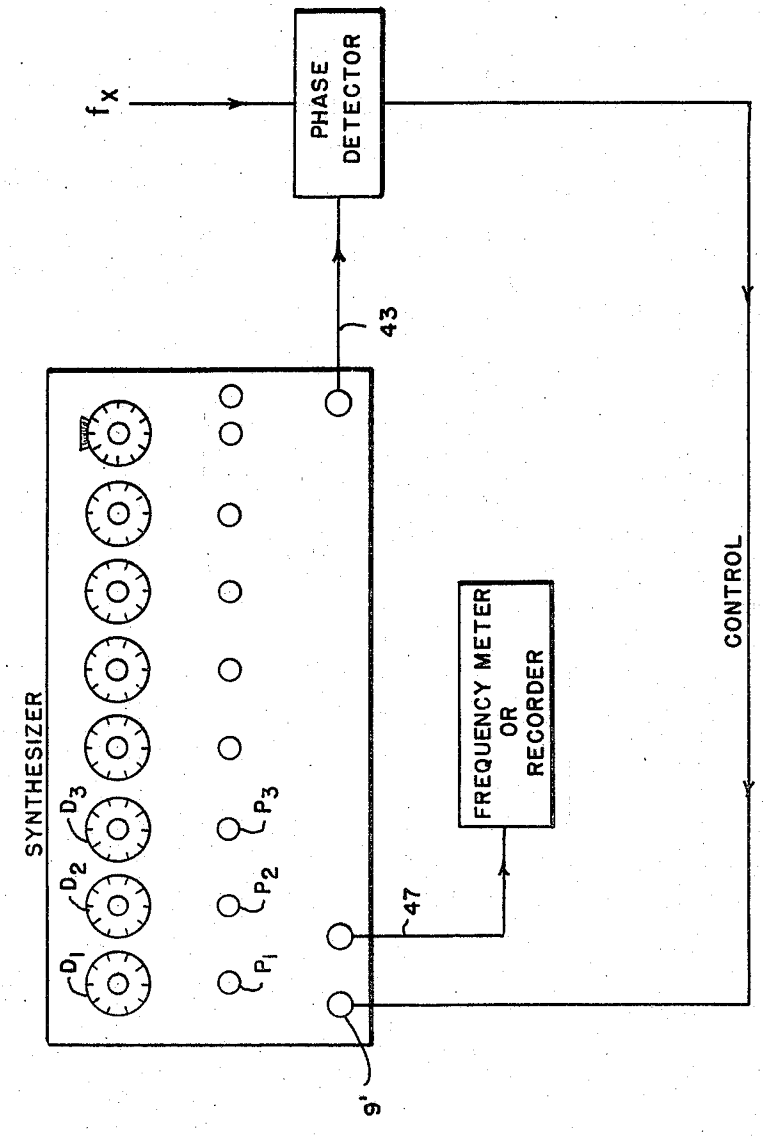
FIG. 6 is a block diagram of a modified system embodying the apparatus of FIG. 1.

In FIG. 6, an unknown and drifting frequency $f_x$ is shown compared in a conventional phase detector with the synthesizer output at 43. The control voltage from the phase-detector is applied to the external control input at 9', and an appropriate push button ($P_1$ to $P_9$) is actuated. By virtue of this connection, the output at 43 follows and remains precisely equal to the drifting frequency $f_x$. As the output frequency varies, the beat frequency output at 47 varies proportionally, but with high magnification as selected by the actuated push button. This magnified frequency drift, relative to the frequency displayed by the digit dials, may be observed or automatically recorded at output 47.

Many other similar applications of the novel circuitry herein described will, of course, occur to those skilled in the art.

Figure 5:
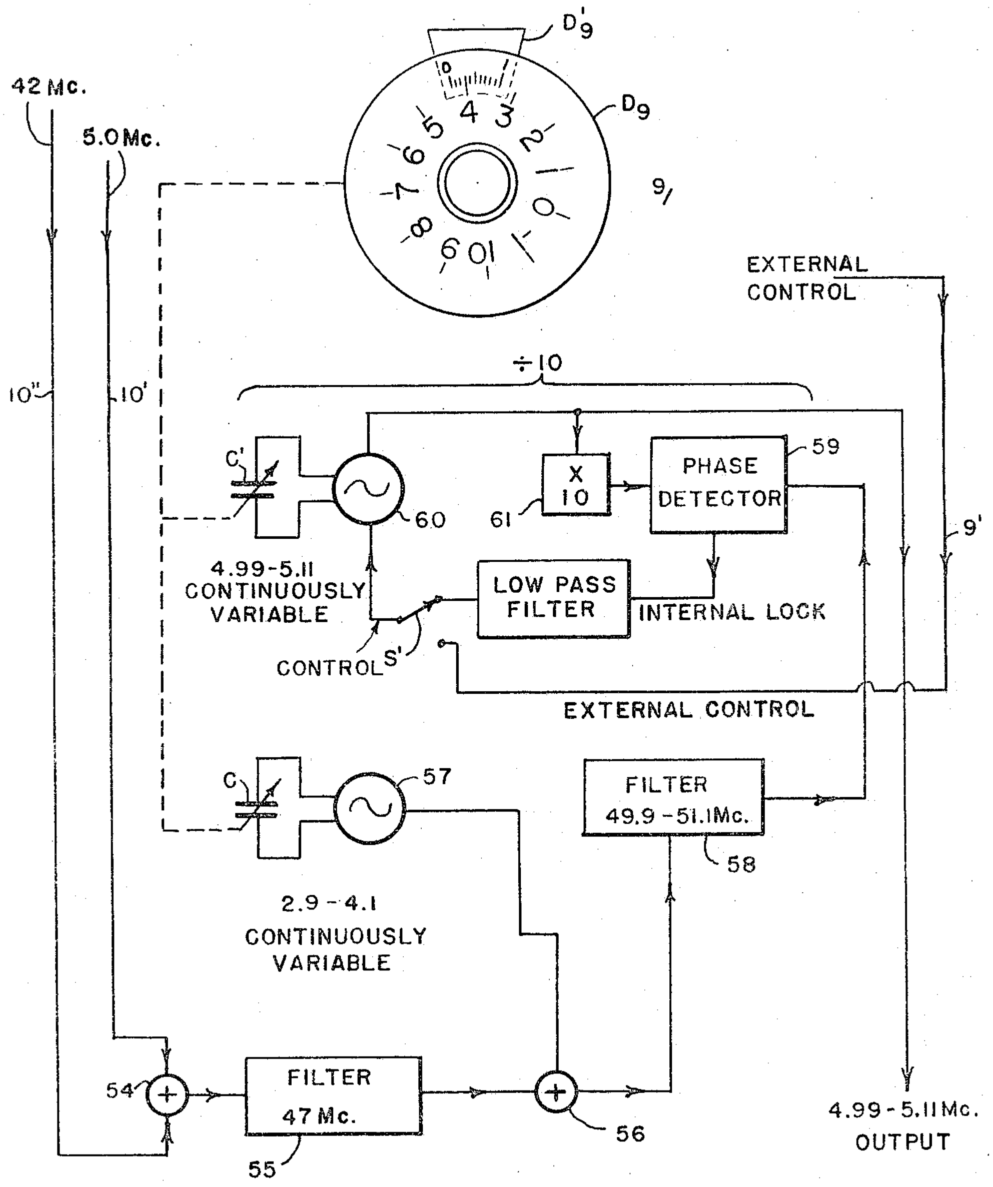
FIG. 5 is a similar view of the continuously adjustable digit unit of FIGS. 1 through 3.

A preferred form of continuously adjustable digit unit 9 for use in the previously described embodiments is illustrated in FIG. 5, receiving the 5.0 mc. standard input at 10' from the fixed frequency source 10 and mixing the same with the standard 42 mc. reference input at 10'' in a first mixer 54 to produce a resultant 47 mc. output that may be filtered at 55. This output is, in turn, applied to a second mixer 56 into which frequencies from 2.9 to 4.1 mc. are fed from an adjustable oscillator 57, the adjustment of the tuning capacitor C of which is mechanically ganged to the adjustment of the dial $D_9$, to generate frequencies in the range of from 49.9 to 51.1 mc., filtered at 58 and applied to a phase detector 59. In an "internal lock" position, switch S' applies the phase detector control output to a voltage-variable capacitor in the output oscillator 60, the tuning capacitor C' of which is also ganged to dial $D_9$. The output frequency, multiplied by ten, is compared in phase-detector 59 to the 49.9–51.1 mc. frequency output of mixer 56, so that, by virtue of the control output of phase detector 59, the output oscillator is locked to exactly one-tenth of the 49.9–51.1 mc. frequency resulting from adding the output of oscillator 57 to the 47 mc. standard frequency at the output mixer 54. The system thus acts as a factor-of-ten divider. It should be noted that since 47 mc. of the 49.9–51.1 mc. reference signal to the phase detector 59 is directly derived from the primary standard, the output frequency is, percentage-wise, from 12 to 16 times more stable than would be the frequency generated by output oscillator 60, if it were the sole frequency-determining means.

When the switch S′ is moved to the "external control" position, the oscillator 60 is now free-running, and may, for example, be continuously swept, as before described, to produce continuously changing frequencies from 4.99 to 5.11 mc., or more.

Referring to FIG. 4, a preferred form of the digit unit 1–7 is illustrated. An input in the range of 5.0 to 5.1 megacycles is applied to a first mixer 62 where it is mixed with the 42 megacycle standard frequency from input 10″ to produce an output of from 47 to 47.1 mc., filtered at 63. In the case of unit 1, for example, the input at 21 may be 5.0394012 (FIG. 2) and the dial $D_1$ may be set at "7." The said output of filter 63 is applied to a second mixer 64 into which one of the standard frequency steps in the "picket fence" from 3.0 to 3.9 megacycles is fed to produce an output within the range of 50 to 51 megacycles. The selected one of the "picket fence" frequencies (in this example, 3.7 mc.) controls digit oscillator 66 via switchable low-pass filter E. The "picket fence" of standard frequencies 3.0, 3.1, 3.2 . . . 3.9 mc. is applied at 10‴ to a phase detector 65 controlling by means of a voltage-variable capacitor or other conventional means the frequency of the phase-locked digit oscillator 66. The coarse tuning capacitance C″ of oscillator 66 is adjustable in steps with dial $D_1$ very close to any selected "picket" of the "picket fence." The oscillator 66, as set by the dial $D_1$, is thus tuned to be captured by that one of the "picket fence" signals that is desired—in this example, the "7" picket.

The "control" output of phase detector 65 must, in a conventional manner, be passed through a low-pass filter to remove high-frequency components from the control signal applied to the controlled oscillator 66. As discussed by H. T. McAlleer, Proc. IRE June 1959, "A New Look at the Phase Locked Oscillator," and elsewhere, the "capture" range and the "lock" range of the phase detector and oscillator combination are controlled by the cut-off characteristics of this filter. If the cut-off frequency is high, the capture range is large but the rejection of unwanted components is not as complete as may be desired. On the other hand, if the cut-off frequency is low, the capture range may be inadequate although the lock range, after capture, is still large.

In order to achieve both wide capture range and adequate rejection of unwanted components in normal operation after capture, it may be desirable to lower the cut-off frequency of the filter, after capture has been achieved. It may be necessary simultaneously to decrease the loop gain of the phase detector and oscillator servo system in order to avoid loop instability in the narrow band condition.

Figure 4A:
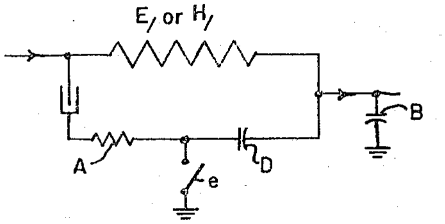

In the present invention this dual result, namely, narrowing the filter pass-band and reducing the loop gain is achieved by the closure of a single switch. The closure is automatic, resulting from the disappearance of the beat note between the reference signal and the oscillator signal at the phase detector output when capture is achieved. With reference to FIG. 4, the switchable low-pass filter is shown in block form, and also in detail of one preferred embodiment in FIG. 4*a*. The switch *e*, shown symbolically in FIG. 4*a*, may be a conventional diode or transistor switch, which closes whenever there is no beat frequency signal through audio amplifier 70 rectified by rectifier 71. When switch *e* closes, the loop gain is reduced by connection of resistor A (in series with a blocking condenser D) across the phase detector output, and the cut-off frequency of the filter is lowered by the connection of condenser B across its output.

It will be seen that in addition to the desired "picket" at the input to phase detector 65, other pickets are also present spaced at multiples of 100 kc. from the desired one, and corresponding signals at the phase detector output must be removed by filter E. The automatic switching just described permits filter E to eliminate these components, after capture, yet permits the phase detector and oscillator combination to have a wide enough "capture' range to lock on to the desired picket, even when the rough-tuned frequency of the oscillator 66 is not precisely that of the desired picket.

One input to mixer 64 is the output of locked digit oscillator 66, in this example 3.7 mc. corresponding to the "7" picket. This frequency adds in mixer 64 to the output signal from filter 63 to produce a signal between 50 and 51 mc. which is filtered from other undesired mixing components in filter 67. In the above example, this "reference" frequency is 50.7394012 mc. The output of filter 67 may be compared in phase detector F with the tenth harmonic of output oscillator G, as indicated in FIG. 4, and the control output of phase detector F used to lock output oscillator G to exactly one tenth of the reference frequency from filter 67. In the numerical example, the output oscillator frequency is 5.07394012 mc.

The control output of phase detector F may be passed through a second switchable low-pass filter H similar in principle to filter E described above. The same sensing circuits 70, 71 may, if desired, receive an input from the control output line 69 of phase detector F and control the cut-off frequency of filter H in a manner similar to that described above for filter E.

As another simpler example of the frequency synthesizing process occurring in a digit insertion unit, if the input frequency had been 5.02, as in unit 6 of FIG. 2, the frequency after 62, FIG. 4, would be 47.02; and, with the dial 6′ set at 1, as in FIG. 2, the other input to 64, FIG. 4, would be 3.1 mc. and its output would be 50.12 mc., with the ultimate output 5.012 mc.

In the event of malfunction of the digit insertion unit, as when either phase-locked circuit improperly operates, a beat note will persist at the output of phase detector 65 or phase detector F and the associated sensing transistor, such as the transistor $T_1$ in the case of unit 1, will shut off, causing extinguishment of lamp $L_1$ and thus indicating improper operation. If, for example, an A.C. signal appears in the supposedly D.C. feedback from the phase-detector 65 to the oscillator 66, it will be fed through audio amplifier 70, and cause rectifier 71 to generate a cut-off signal for sensing transistor $T_1$ and thus to shut off lamp $L_1$. Similar remarks apply with regard to the operation of the other sensing transistor stages of FIG. 1 and the same failure-detecting operation may be used with the divider 68 (FIG. 4) if of the phase-locked type discussed above (comprising multiplier M, oscillator G and phase detector F) and also in connection with FIG. 5. It should be observed that if switchable low-pass filters are used in digit selection and output phase-locked oscillators, the other filters in the system may be much simplified, since the switchable filters remove undesired components which have not been rejected by earlier filtering.

The method of achieving the 10/1 division, together with careful choice of input frequencies to the mixer, results in considerable simplification of the overall filtering. For instance, the 5/5.1 and 42 mc. mixing frequencies have been carefully chosen so that all "coincidences" of order lower than the 28th are avoided, and lower order spurious products are relatively far removed from the 47/47.1 mc. mixer output. For example, the ninth harmonic of 5.0, at 45 mc., is 2 mc. out of succeeding filter passbands. Since such far-removed frequencies are far outside of the passband required in the "lock" condition of the output phase detector divider, the relatively simple R and C filter in this control circuit can be used to help eliminate them. Consequently the 47 mc. filter can be made very simple.

Similar arguments apply to the 3/3.9 and 47/47.1 mixing.

While preferred switching and oscillator circuits have been described, clearly other equivalent circuit arrangements can be employed to practice the underlying concepts of the invention, and all such are considered to fall within the spirit and scope of the invention as defined in the appended claims.

What is claimed is:

1. Synthesizing apparatus having, in combination, a source of input signal, a plurality of serially connected step-wise adjustable digit insertion units connected with the source for synthesizing a multi-digit quantity corresponding to the signal, a continuously adjustable digit unit connected with the source, means for selecting a group of successive units of the plurality of digit insertion units and disconnecting the same from the remainder of the plurality of digit insertion units, means for connecting the continuously adjustable digit unit to the said remainder of the plurality of digit insertion units, and means for beating the output of the said group of digit insertion units with the output of the continuously adjustable digit unit to compare the setting of the latter with the adjustment of the said group in order that the adjustment of the continuously adjustable digit unit may have a known relationship to the adjustment of the said group.

2. Frequency synthesizing apparatus having, in combination, a standard frequency source, a plurality of serially connected step-wise adjustable digit insertion decade frequency units connected with the source for synthesizing a multi-digit decimal output frequency, a continuously adjustable digit frequency unit connected with the said source, means for selecting a group of successive units of the plurality of digit insertion decade frequency units and disconnecting the same from the remainder of the plurality of digit insertion decade frequency units, means for connecting the continuously adjustable digit unit to the said remainder of the plurality of digit insertion decade frequency units, and means for beating the outputs of the said group of digit insertion decade frequency units with the output of the continuously adjustable digit frequency unit to compare the setting of the latter with the adjustment of the said group in order that, at zero beat, the frequency adjustment of the continuously adjustable digit frequency unit may correspond to the frequency of the said group and, at other beat frequencies, the frequency adjustment of the continuously adjustable digit frequency unit may be a known difference frequency from the frequency of the said group.

3. Apparatus as claimed in claim 2 and in which each of the said units is provided with illuminable indicating means, and the said selecting and disconnecting means comprises means for extinguishing illumination of the indicating means corresponding to the said group.

4. Apparatus as claimed in claim 3 and in which means is provided for automatically extinguishing the illumination of an indicating means corresponding to a malfunctioning digit insertion decade frequency unit.

5. Apparatus as claimed in claim 2 and in which the said selecting and disconnecting means comprises a plurality of pushbutton-operated switching means.

6. Apparatus as claimed in claim 2 and in which the said standard frequency source produces a first reference frequency for application to the said continuously adjustable digit frequency unit, a much higher second reference frequency and a "picket fence" of successive steps of frequency for application to the said plurality of step-wise adjustable digit frequency units.

7. Apparatus as claimed in claim 6 and in which the first reference frequency is substantially 5 megacycles, the second reference frequency is substantially 42 megacycles and the said "picket fence" frequency steps are substantially 3.0, 3.1, 3.2, 3.3, 3.4, 3.5, 3.6, 3.7, 3.8 and 3.9 megacycles.

8. Apparatus as claimed in claim 6 and in which each said decade unit comprises a first mixer connected to mix the said first and second reference frequencies of the said source, adjustable phase-locked oscillator means connected to the "picket fence" frequency output of the said source to be locked to one of the step frequencies thereof corresponding to the adjustment of the oscillator, a second mixer connected to the said oscillator and the first mixer, and a divider connected to the second mixer to produce an output corresponding to the said first reference frequency supplemented by a frequency corresponding to the adjustment of the oscillator of the decade unit.

9. Apparatus as claimed in claim 6 and in which the said continuously adjustable frequency unit comprises a first adjustable oscillator tunable in the range of the said first reference frequency, a second synchronously adjustable oscillator tunable in the range of the said "picket fence" frequencies, a first mixer connected to the said first and second reference frequencies, a second mixer connected to the first mixer and to the second oscillator and a phase-locking circuit connected to the second mixer and the first oscillator.

10. Apparatus as claimed in claim 9 and in which the first and second reference frequencies are substantially 5.0 and 42 megacycles, respectively, the outputs of the first and second oscillators are continuously adjustable in the respective ranges of substantially 4.99 to 5.11 and 2.9–4.1 megacycles, the outputs of the first and second mixers are substantially 47.0–47.1 and 50–51 megacycles, respectively, and the first oscillator is connected through a factor-of-ten multiplier to a phase detector connected to the second mixer output and the first oscillator.

11. Apparatus as claimed in claim 10 and in which means is provided for applying an external control voltage to the first oscillator.

12. Apparatus as claimed in claim 2 and in which multiplier-mixer means is provided connected similarly to multiply the output of the plurality of digit insertion decade frequency units and an output of the said source to mix the same to produce an output frequency corresponding to the settings of the plurality of digit insertion decade frequency units when a group thereof is not disconnected from the plurality of digit insertion decade frequency units and to the settings of the remainder of the digit insertion decade frequency units and the continuously adjustable digit frequency unit when a group of digit insertion decaed frequency units is selected and disconnected.

13. Apparatus as claimed in claim 2 and in which each said decade unit comprises adjustable phase-locked oscillator means.

14. Apparatus as claimed in claim 13 and in which there is provided means for detecting malfunction of each decade unit by the presence of alternating-current in the phase-locking control circuit of the said oscillator.

15. Apparatus as claimed in claim 14 and in which each decade unit is provided with illuminable setting indicating means, and the said malfunction-detecting means is connected to extinguish the illumination of the indicating means corresponding to a malfunctioning decade unit.

16. Apparatus as claimed in claim 15 and in which the said detecting means comprises low-pass filter, amplifying and rectifying means and sensing transistor means responsive to an output of the rectifying means indicative of said malfunction.

17 Apparatus as claimed in claim 2 and in which means is provided for electrically sweeping the frequency of the said continuously adjustable frequency unit to produce markers when the said beat frequency passes through zero.

References Cited by the Examiner

UNITED STATES PATENTS 3,227,963 1/1966 Dimmick ---------- 331—38 X

NATHAN KAUFMAN, *Primary Examiner.*

ROY LAKE, *Examiner.*

S. H. GRIMM, *Assistant Examiner.*